United States Patent
Kirschner et al.

(10) Patent No.: US 9,918,044 B2
(45) Date of Patent: Mar. 13, 2018

(54) HANDHELD OBSERVATION DEVICE COMPRISING A DIGITAL MAGNETIC COMPASS

(71) Applicant: Vectronix AG, Heerbrugg (CH)

(72) Inventors: Holger Kirschner, Widnau (CH); Silvio Gnepf, Heerbrugg (CH)

(73) Assignee: Safran Vectronix AG, Heerbrugg (CH)

(*) Notice: Subject to any disclaimer, the term of this patent is extended or adjusted under 35 U.S.C. 154(b) by 400 days.

(21) Appl. No.: 14/682,693

(22) Filed: Apr. 9, 2015

(65) Prior Publication Data

US 2015/0296185 A1     Oct. 15, 2015

(30) Foreign Application Priority Data

Apr. 9, 2014 (EP) .................................. 14164038.3

(51) Int. Cl.

| | |
|---|---|
| *G01C 17/38* | (2006.01) |
| *H04N 7/18* | (2006.01) |
| *G01C 17/02* | (2006.01) |
| *G06T 7/70* | (2017.01) |

(52) U.S. Cl.
CPC ............... *H04N 7/18* (2013.01); *G01C 17/02* (2013.01); *G01C 17/38* (2013.01); *G06T 7/70* (2017.01)

(58) Field of Classification Search
CPC ................................... H04N 7/18; G01C 17/38
USPC ....................................... 33/272, 356; 702/93
See application file for complete search history.

(56) References Cited

U.S. PATENT DOCUMENTS

| | | | |
|---|---|---|---|
| 5,117,375 A | 5/1992 | Worcester et al. | |
| 5,786,849 A * | 7/1998 | Lynde | G01C 3/04 |
| | | | 348/113 |
| 6,009,629 A | 1/2000 | Gnepf et al. | |
| 6,539,639 B2 | 4/2003 | Smith | |
| 7,002,551 B2 | 2/2006 | Azuma et al. | |

(Continued)

FOREIGN PATENT DOCUMENTS

| | | |
|---|---|---|
| EP | 2 530 429 A1 | 12/2012 |
| EP | 2 600 109 A2 | 6/2013 |

(Continued)

OTHER PUBLICATIONS

Hartley, et al. "Multiple View Geometry in Computer Vision"; Second Edition Cambridge University Press; Mar. 2004.

(Continued)

*Primary Examiner* — Christopher Fulton
(74) *Attorney, Agent, or Firm* — Muncy, Geissler, Olds & Lowe, P.C.

(57) ABSTRACT

The invention relates to a handheld observation device including a digital magnetic compass for measuring a magnetic field direction of a magnetic field present, a gravitation sensor for measuring a gravitational field direction of a gravitational field present, and a control and evaluation unit configured for determining an externally referenced orientation of the observation device depending on a measured magnetic field direction and a measured gravitational field direction and with application of an algorithmic disturbance suppression, for which compensation parameters are stored. The observation device can also include a video tracking system (4) for recording an image sequence and for deriving orientation changes of the observation device.

15 Claims, 5 Drawing Sheets

(56) References Cited

U.S. PATENT DOCUMENTS

| | | | | |
|---|---|---|---|---|
| 7,891,103 | B2* | 2/2011 | Mayor | G01C 17/38 |
| | | | | 33/356 |
| 8,370,097 | B2 | 2/2013 | Patel et al. | |
| 8,581,935 | B2* | 11/2013 | Handa | G01C 17/28 |
| | | | | 345/659 |
| 8,645,093 | B2* | 2/2014 | Brunner | G01R 33/0035 |
| | | | | 324/245 |
| 8,825,425 | B2* | 9/2014 | Kadokura | G01C 17/38 |
| | | | | 33/356 |
| 8,826,550 | B2* | 9/2014 | Gnepf | G01B 11/26 |
| | | | | 33/228 |
| 8,844,148 | B2* | 9/2014 | Ohta | G01C 17/28 |
| | | | | 33/334 |
| 8,860,801 | B2* | 10/2014 | Nishikawa | H04N 5/225 |
| | | | | 348/113 |
| 8,898,034 | B2* | 11/2014 | Huang | G01C 17/28 |
| | | | | 701/525 |
| 9,008,987 | B2* | 4/2015 | Tanabe | G01C 9/06 |
| | | | | 33/356 |
| 9,052,192 | B2* | 6/2015 | Hahm | G01C 17/28 |
| 9,494,686 | B2* | 11/2016 | Maryfield | G01S 17/42 |
| 9,506,755 | B2* | 11/2016 | Tu | G01C 17/38 |
| 2011/0275408 | A1 | 11/2011 | Kulik | |

FOREIGN PATENT DOCUMENTS

| | | |
|---|---|---|
| EP | 2 623 995 A1 | 8/2013 |
| GB | 2 128 749 A | 5/1984 |

OTHER PUBLICATIONS

European Search Report and Written Opinion dated Oct. 22, 2014 in European Application No. 14 16 4038.

D. Gebre-Egziabher, G.H. Elkaim, D. Powell, B.W. Parkinson; A non-linear, two-step estimation algorithm for calibrating solid-state strapdown magnetometers; Proceedings of the International Conference on Integrated Navigation System, St. Petersburg Russia, May 28, 2001; pp. 290-297.

* cited by examiner

HANDHELD OBSERVATION DEVICE COMPRISING A DIGITAL MAGNETIC COMPASS

This application claims priority to European Patent Application No.: 14164038.3, which was filed in Europe on Apr. 9, 2014, and which is herein incorporated by reference in its entirety.

The invention relates to a handheld observation device comprising a digital magnetic compass (measurement of magnetic field direction), a gravitation sensor (measurement of gravitational field direction), and a control and evaluation unit configured for determining an externally referenced orientation of the observation device from the measurements with application of an algorithmic disturbance suppression.

The invention also relates to a method of the generic type for determining an externally referenced orientation of a handheld observation device, and to a computer program product comprising program code, stored on a machine-readable carrier, for controlling or carrying out the method.

The digital magnetic compass (DMC) is still indispensible for many orientation tasks. It substantially consists of a combination of magnetic field sensors, inclination sensors, and a control and evaluation unit. The latter calculates the current orientation with respect to magnetic north direction and gravitational field direction from the measurement data of the sensors. Moreover, by way of example, a correction to the geographical north direction or an adaptation into arbitrary coordinate systems can be calculated.

Such a DMC can be integrated for example into an observation device for providing north-referenced azimuthal direction information. Such an observation device can be embodied for example as a monocular, binocular, night vision device, telescope, periscope, etc., with a completely optical or partly electronic observation path. Examples of such observation devices are the commercially available devices Vectronix Moskito, PLRF and JIM LR.

In practice, measurement errors in the orientation measurement occur as a result of the influence of static magnetic fields or as a result of ferromagnetic materials in the device. Such disturbances can corrupt the determination of the north referencing. Such influences are reduced by the application of known calibration or calibrating methods (U.S. Pat. No. 6,009,629, U.S. Pat. No. 5,117,375, GB2128749, U.S. Pat. No. 6,539,639), in particular with application of known disturbance models such as IGRF or WMM.

If a DMC is incorporated into an observation device, a calibration is required in order to compensate for influences of magnetic parts within the device. Said magnetic parts are, in particular, ferromagnetic parts and electronic equipment as a source of magnetic fields as a result of electric currents.

A suitable compensation of such disturbance influences is described in publication "A NON-LINEAR, TWO-STEP ESTIMATION ALGORITHM FOR CALIBRATING SOLID-STATE STRAPDOWN MAGNETOMETERS" by D. Gebre-Egziabher, G. H. Elkaim, J. D. Powell and B. W. Parkinson by the Department of Aeronautics and Astronautics at Stanford University, published in Proceedings of the International Conference on Integrated Navigation System, St. Petersburg Russia, May 28-30, 2001, pages 290-297. This publication explains the principles of compass calibration or compensation and presents an example of a corresponding solution method.

U.S. Pat. No. 6,009,629 discloses a method for determining Earth's magnetic field in cases of disturbances as a result of magnetic material incorporated into the device or fitted thereto. For this purpose, an electronic magnetic compass fitted on the equipment is brought into N different spatial positions, wherein magnetic field and inclination angle are measured in the context of a compensation or calibration procedure. The data acquired in this case make it possible, using mathematical algorithms, to determine the actual Earth's magnetic field and to remove disturbance influences.

For handheld devices with compass, the calibration process typically comprises a prescribed movement of the device, which has to be performed by the user. In modern devices, this is advantageously instructed by the device software in the context of a user guidance, wherein the movements of the device are monitored if possible. There are also disturbance corrections which manage without a defined calibration movement and can be parameterized within normal operation (see e.g. U.S. Pat. No. 8,370,097). Such corrections use reduced models for the magnetic disturbances. The determination of the orientation by means of the compass calibrated in this way is thus correspondingly more susceptible to errors, however.

Electronic magnetic compasses are available for example as prefabricated modules such as the Vectronix DMC-SX, which already provides basic routines and algorithms for performing such a calibration/compensation in the firmware. These digital compass modules can be incorporated into an observation device which provides additional functions such as, for example, day and night vision observation or laser distance measurement.

For a functional compensation it is desirable for a prescribed pattern of alignments (calibration pattern) to be complied with during the calibration, which pattern enables enough information for determining the compensation parameters.

Since such calibration patterns may be relatively complicated for an inexperienced user (see hereinafter FIG. 1 and FIG. 2 with the associated figure descriptions), an adequate user guidance is advantageous. A typical calibration process lasts approximately one minute. Owing to the influence of movements, in particular pivoting movements, on the measurement results, the device must be kept steady during a measurement process. In addition, the measurement results must be integrated over a certain time period (typically 1 second) for the purpose of compensating for tremble of the user's hand.

For the various alignments of the device within the calibration process, it is possible to use rough estimates that need not be adhered to with great accuracy. By way of example, an accuracy range of ±20° in the azimuth and of ±10° in elevation and roll angle is generally sufficient for detecting usable compensation parameters.

Adhering to these guideline values is typically not a problem with regard to elevation and roll angle, since these can be determined with sufficient accuracy according to the alignment of the device in the gravitational field with the aid of accelerometers. However, the measurement with regard to azimuth, despite the large associated tolerance range, may be too inaccurate if strong magnetic disturbances are present.

The parameter fit of the calibration can only be carried out in an error-optimized manner if the underlying system of equations is overdefined (more equations than unknown parameters). Therefore, a sufficient variation of the orientation of the compass during the calibration is crucial and a monitoring user guidance is necessary, which in turn slows down the calibration (depending on the complexity of the geometry and the number of measurement points).

Simplified error models for the disturbance suppression can reduce the time requirement for the calibration somewhat (fewer parameters), but these models may reduce the measurement errors less successfully—the measurement thereby becomes more susceptible to errors.

Other known calibration or compensation solutions, such as are used for example for electronic compasses in mobile devices such as a smart phone, enable only a coarse compensation of only some of the potential disturbance influences.

By way of example, for calibration purposes, rotating the device about its horizontal axis does not suffice to compensate for all influences and to achieve a desired accuracy of a few degrees or less, as is also explained in U.S. Pat. No. 6,009,929. Furthermore, complicated three-dimensional movements are difficult to explain and difficult to perform for an inexperienced user. The highly accurate approach presented in the present application differs significantly from approaches which enable only a partial compensation to be achieved. Accuracies of significantly better than 0.5° are intended to be made possible by means of the approach presented here. Such accuracies are far better than requirements such as are made for example of a vehicle navigation system or for determining the orientation of a cellular phone.

Following the calibration process, the device can carry out orientation measurements. As long as the magnetic properties of the device do not change to an excessively great extent, the correction model is appropriate, and the measurement errors are reduced to acceptable values.

An alternative system for determining orientation changes and even position changes, i.e. changes not only in alignment but also in location, is a video tracking system. In this case, a camera sequentially records images of the surroundings. An alteration of the camera position leads (in the case of suitable surroundings of the camera) to an alteration of the recorded image content. A processing unit calculates the underlying position change from the alteration in the image contact. U.S. Pat. No. 7,002,551 describes a handheld see-through device which uses a video tracking system for the measurement of orientation changes. A combination of an inertial sensor ("inertial measurement unit", IMU) with a video tracking system is likewise described. If the user keeps the device steady, the orientation is measured by the video tracking system. In the case of rapid movement of the device and in the case of low-contrast surroundings, the IMU performs the orientation measurement.

The measurement or orientation determination with the aid of a video tracking system is only of a relative nature (determination of changes in orientation and/or position) without the aid of additional information. A conversion into absolute orientations of a map coordinate system presupposes additional information such as, for example, GPS position or images of objects (reference points) having known map coordinates.

Moreover, in surroundings with low usable contrast, for example in the case of measurements in dense fog, problems can occur because the image content then does not change even in the event of a position change.

Even the use of contrast-assisting measures, for example the combination of a conventional camera with a night vision camera or a thermographic or infrared camera or a multispectral recording and active illumination of the surroundings in the camera's field of view, cannot always eliminate the problem.

Moreover, the measurement of position changes by means of a video tracking system is algorithmically complex and in the case of relatively long measurement times, especially for handheld devices, may pose a problem as a result of increased power consumption and production of heat.

By contrast, a magnetic compass can directly determine the magnetic north direction, wherein the measurement can be carried out rapidly and simply and is independent of the lighting situation.

A further system which makes orientation and position changes detectable is an IMU (inertial measurement unit, inertial sensor). The latter is a combination of angular velocity and acceleration sensors with a processing unit. By integrating the equations of motion over time, the processing unit thus determines arbitrary position changes. The measurement is once again only of a relative nature; a determination of the absolute position in a map coordinate system presupposes additional information, in a manner similar to that in the case of the video tracking system.

What is problematic in the case of the IMU is that measurement errors accumulate as a result of the integration over time and thus increase greatly with the duration of the measurement (drift). By contrast, a magnetic compass always yields the same quality of the measurement for measurement durations of arbitrary length (without drift).

Of all the systems for measuring the orientation, the digital magnetic compass thus has decisive advantages.

To summarize, the following can be stated: compass calibration is time-consuming and susceptible to user errors. An improved system would reduce the time requirement for the calibration and simplify the movement sequence during the calibration.

After the compass has been calibrated, a change in the surroundings (e.g. addition of a new battery that contains ferromagnetic parts) can again lead to erroneous measurements.

An improved system would monitor measurements of the magnetic compass by other methods, without reducing the measurement accuracy of the compass.

Therefore, it is an object of the present invention to provide an improved calibration or compensation routine for an observation device comprising an electronic magnetic compass, which routine is implementable even under difficult ambient conditions.

It is a particular object of the invention to provide a handheld observation device comprising a digital magnetic compass module with a calibration or compensation routine using measurements of a video tracker, which routine is robust against magnetic disturbances in the surroundings, wherein the measurement accuracy of the compensated measurement can be monitored by evaluations of a video tracker.

It is an object of the invention, moreover, to provide a method for determining reliable information in particular regarding the azimuth angle, in association with a user guidance for a calibration pattern of the digital magnetic compass (DMC), even in the case of severe magnetic disturbances.

These objects are achieved by means of the realization of the characterizing features of the independent claims. Features that develop the invention in an alternative or advantageous manner can be gathered from the dependent patent claims.

The deficiencies of the currently available digital magnetic compass technology (DMC) can be decisively improved in multiple ways by combination with a video tracking system.

Firstly, the video tracking system can achieve a measurement of the orientation change in the azimuth angle for the compass calibration. In this regard, the compass calibration becomes independent of (possibly erroneous) compensation parameters already present. If the orientation variation is measured during the compass calibration by means of the video tracking system, then this additional information can be used for an improved parameter fit of the compass calibration, which leads to a reduction of the number of measurement points and a simplification of the measurement geometry; a shorter, simplified movement is sufficient.

Secondly, it is now possible to use inclination information even during the movement, since the orientation measurement by means of the video tracking system can assist the inclination measurement.

The inclination measurement is carried out at the beginning of the calibration measurement in the quiescent state by means of the inclination sensor system of the DMC (acceleration sensors). The changes in the orientation that are carried out thereafter are measured by the video tracking system. In this regard, it is possible to dispense with the inclination sensor system of the DMC during the further calibration measurement, and measurement pauses during the movement are no longer necessary.

This reduces the time requirement for the compass calibration, simplifies the user guidance and prevents an erroneous calibration by the user.

On the other hand, under good conditions, i.e. in the case of objects readily recognizable in the surroundings, the orientation measurement of the video tracking system can be used to check the orientation changes of the compass. In the case of incorrect measurements, the measurement can be marked as invalid and/or a recalibration can be constrained.

The subject matter of the invention is therefore a handheld observation device comprising a digital magnetic compass for measuring a magnetic field direction, a gravitation sensor for measuring the gravitational field direction, and a control and evaluation unit configured for determining an externally referenced orientation of the observation device depending on the magnetic field direction and gravitational field direction and with application of an algorithmic disturbance suppression, for which compensation parameters—relating to a compensation of local magnetic field disturbance influences—are stored.

According to the invention, the observation device furthermore comprises a video tracking system for recording an image sequence and for deriving—carried out on the basis of the image sequence—orientation changes of the observation device. In this case, the control and evaluation unit is configured in such a way that the determination of the externally referenced orientation is (if appropriate furthermore) influenced by orientation changes derived by the video tracking system, in particular by virtue of the fact that the stored calibration parameters are based (if appropriate inter alia) on orientation changes derived by the video tracking system.

The advantages of the integration according to the invention of a video tracking system into the observation device according to the invention have already been described thoroughly above. In particular, the inclusion of orientation information measured by means of the video tracking system can be used for an improved parameter fit, which makes it possible to reduce the number of measurement points and to simplify the measurement geometry.

Preferably, the evaluation and control unit provides a calibration functionality designed to carry out a calibration of the disturbance suppression in a user-assisted manner in the field, wherein for the calibration a sequence of a plurality of calibration measurements is defined, in particular at least five, for which the observation device is to be brought into a plurality of different rotational positions, and wherein calibration measurement variables are automatically detected in the context of the calibration functionality. Said calibration measurements encompass—at least for each of the calibration measurements—a magnetic field direction measured by the magnetic compass (and optionally also a gravitational field direction measured by the gravitation sensor), and on the basis of said calibration measurement variables the stored calibration parameters are checked and in particular, if appropriate, updated.

In this case, the control and evaluation unit can be configured in such a way that in the context of the calibration functionality, as the calibration measurement variables used for checking and, if appropriate, updating the calibration parameters, furthermore differences between the rotational positions of the observation device adopted in the respective calibration measurements are automatically detected among one another, which are calculated on the basis of orientation changes derived by the video tracking system.

In particular, in this case, the control and evaluation unit is configured in such a way that the differences—detected as part of the calibration measurement variables—in the adopted rotational positions among one another, which are calculated on the basis of orientation changes derived by the video tracking system, are detected in at least one rotational degree of freedom, namely with respect to an azimuthal component, preferably in three rotational degrees of freedom, i.e. with respect to an azimuthal, an elevational and a rolling-angle component.

As a result of the inclusion of an orientation change measured by the video tracking system in the azimuth angle, the compass calibration advantageously becomes independent of (possibly erroneous) calibration data already present.

In accordance with one embodiment, the control and evaluation unit is configured in such a way that in the context of the calibration functionality for bringing the observation device into the plurality of different rotational positions on the part of the user automatically orientation changes are derived by the video tracking system, depending on the orientation changes respectively derived a respective item of user guidance information is derived regarding a rotational position change to be carried out, in order thereby to attain a rotational position striven for.

In accordance with one embodiment, the orientation changes of the observation device are derived by the video tracking system in at least one rotational degree of freedom, namely with respect to an azimuthal component. Preferably, this is once again carried out in three rotational degrees of freedom, i.e. with respect to an azimuthal, an elevational and a rolling-angle component.

In accordance with a further embodiment, the video tracking system is furthermore configured for deriving—carried out on the basis of the image sequence—translational position changes of the observation device, wherein the determination of the externally referenced orientation is furthermore also influenced by translational position changes derived by the video tracking system. In particular, in this case, the stored compensation parameters are based, inter alia, on translational position changes derived by the video tracking system. In this case, preferably the derived translational position changes are used for the compensation of translational location changes of the observation device that are caused in the context of bringing the observation device into the plurality of different rotational positions.

In accordance with a further embodiment, the control and evaluation unit is configured for determining a series of externally referenced orientations for a series of adopted rotational positions of the observation device and in this case the respective externally referenced orientations are determined depending on the measured magnetic field direction, the measured gravitational field direction, and differences between the adopted rotational positions of the observation device, which are calculated by the video tracking system. In this case, the algorithmic disturbance suppression is applied.

In accordance with one embodiment, the control and evaluation unit is configured in such a way that in the context of a determination of a series of externally referenced orientations for a series of adopted rotational positions of the observation device the stored compensation parameters are automatically checked by virtue of the fact that differences between the respectively determined externally referenced orientations are compared with differences between the rotational positions of the observation device respectively adopted in the context of the series among one another, which are calculated on the basis of orientation changes derived by the video tracking system, in particular wherein for the case where a deviation of the differences between the respectively determined externally referenced orientations from the differences calculated—on the basis of orientation changes derived by the video tracking system—exceeds a defined permitted deviation maximum, an item of user information recommending or initiating a further calibration is output automatically via output means provided on the observation device.

In accordance with a further embodiment, the evaluation and control unit provides a referencing functionality designed to produce a magnetic-compass-independent external referencing relative to an orientation of the observation device in a user-assisted manner in the field, for which purpose a sequence of at least one targeting of a known target is defined, about which target information enabling the external referencing is stored or is present by way of user input, for which targeting the observation device is to be brought into a referencing rotational position targeting the at least one target, and in this case in said referencing rotational position and in continuation an image sequence is automatically continuously recorded by the video tracking system and orientation changes of the observation device are derived on the basis thereof, such that in continuation automatically externally referenced orientations are determinable. This is carried out in particular, especially also exclusively, depending on differences between the referencing rotational position and respective rotational positions of the observation device adopted in continuation among one another, wherein said differences are calculated on the basis of orientation changes derived by the video tracking system. In particular, the automatically externally referenced orientations are determinable with inclusion of the available information about the at least one known target enabling the external referencing.

In this case, the control and evaluation unit is advantageously configured in such a way that in the context of a determination of an externally referenced orientation for adopted rotational positions of the observation device a check in particular with regard to influencing by regional magnetic field disturbances can be carried out automatically on the basis of a comparison of the determined externally referenced orientation with an externally referenced orientation determined separately in the context of the referencing functionality, in particular wherein a compensation of regional magnetic field disturbance influences is carried out automatically on the basis thereof.

In accordance with one embodiment, the digital magnetic compass is equipped with inclination sensors, wherein measurements of the inclination sensors can be assisted by orientation change measurements by the video tracking system, and/or the evaluation and control unit is configured in such a way that measurement values of an inertial measurement unit and/or navigation data, in particular GPS data, can be included in the determination of the externally referenced orientation of the observation device.

The inclination measurement is typically carried out at the beginning of the calibration measurement in the quiescent state by means of the inclination sensor system of the DMC (acceleration sensors). The changes in the orientation that are carried out thereafter are measured by the video tracking system. In this regard, it is advantageously possible to dispense with the inclination sensor system of the DMC during the further calibration measurement, and the movement can be carried out faster and with less restriction. In particular, no measurement pauses (or stops) during the movement are necessary. This reduces the time requirement for the compass calibration and simplifies the user guidance.

In accordance with one embodiment, the observation device has at least one continuous observation beam path having an input objective and an output eyepiece for an observer.

In accordance with a further embodiment, the video tracking system has an objective, by which part of surroundings captured can be imaged onto a camera sensor. In this case, in particular, the objective is embodied as a compound objective having a front objective part and a rear objective part, in particular wherein the front objective part is additionally usable as an objective for a telescope for visual observation.

The method according to the invention and the device according to the invention are described in greater detail purely by way of example below on the basis of concrete exemplary embodiments illustrated schematically in the drawings, further advantages of the invention also being discussed. In specific detail in the figures.

Figure 1:
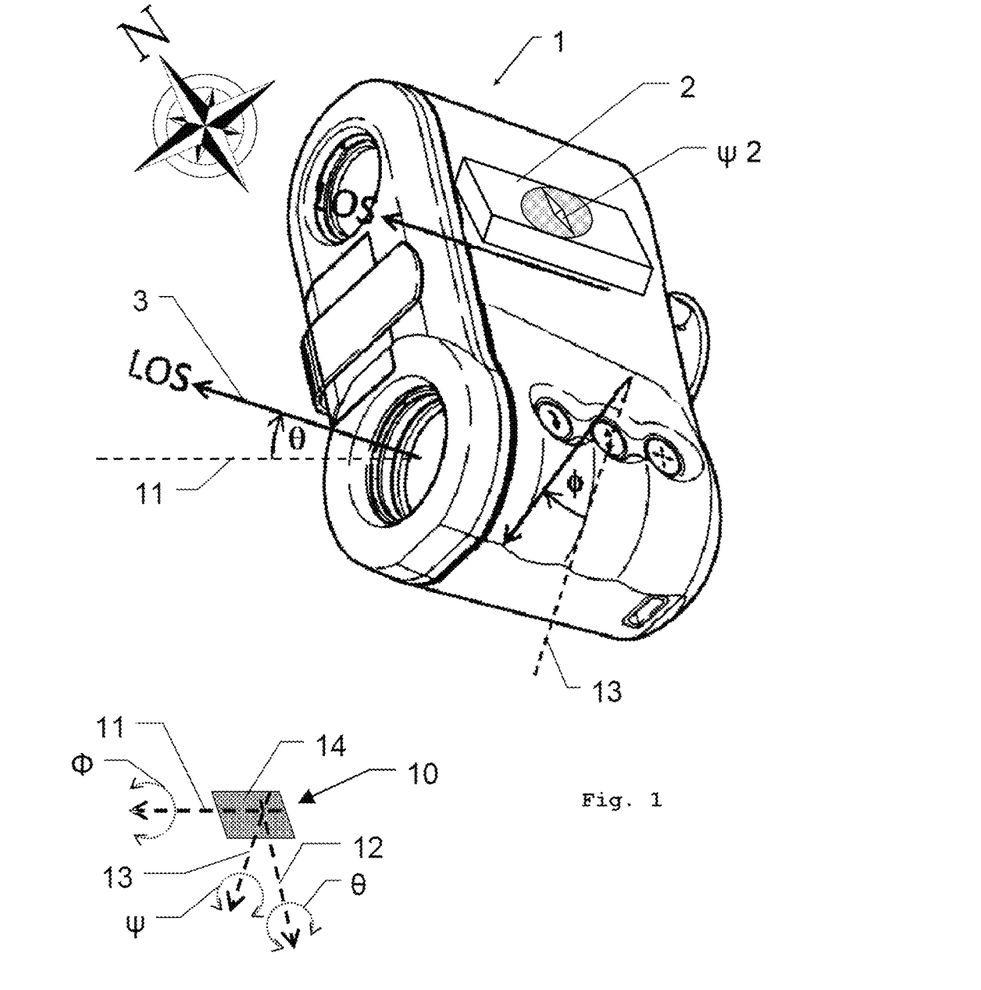
FIG. 1 shows by way of example a handheld observation device in accordance with the prior art comprising a digital magnetic compass.

FIG. 1 shows an example of one embodiment of a handheld observation device 1 in accordance with the prior art, comprising an electronic compass, which is provided as a digital magnetic compass module 2. The observation device 1 has a line of sight 3 (LOS) as an optical axis for an observation, which is identified for example with a reticle, cross hairs or a similar target marking which can be used for sighting a specific target.

The LOS 3 can also be used with regard to various measurement functionalities of the device, such as, for example, with regard to targeting, distance measurement or coordinate determination, determination of elevation, azimuth and oblique position (roll angle).

For this purpose, a coordinate system 10 can be defined, which is illustrated separately from the observation device 1 in FIG. 1 for the sake of clarity. The coordinate system 10 comprises a roll axis 11, which preferably corresponds to or is parallel to the direction of the line of sight 3 if the latter is arranged in the horizontal plane 14, about which roll axis 11 a roll angle θ is defined. Situated approximately perpendicular thereto is an elevation, height or pitch axis 12, about which an elevation angle θ between the horizontal plane 14 and the line of sight LOS 3 is defined. The third axis, approximately perpendicular to the two aforementioned axes, is the azimuth or yaw axis 13, which points toward the center of gravity and about which is defined an azimuth angle ψ as a rotation in the horizontal plane which is to be indicated as the north direction by means of the compass 2.

For a compensation or calibration or correction of the measurement values of magnetic field sensors of the digital magnetic compass (DMC) 2, measurements are performed at a multiplicity of orientations of the device, as described for example in U.S. Pat. No. 6,009,629 or with reference to FIG. 2. Although obtaining compensation parameters is not restricted to a strictly defined set of orientations, there are preferred patterns that provide a well-determined set of measurement data for a highly accurate calibration.

Figure 2:
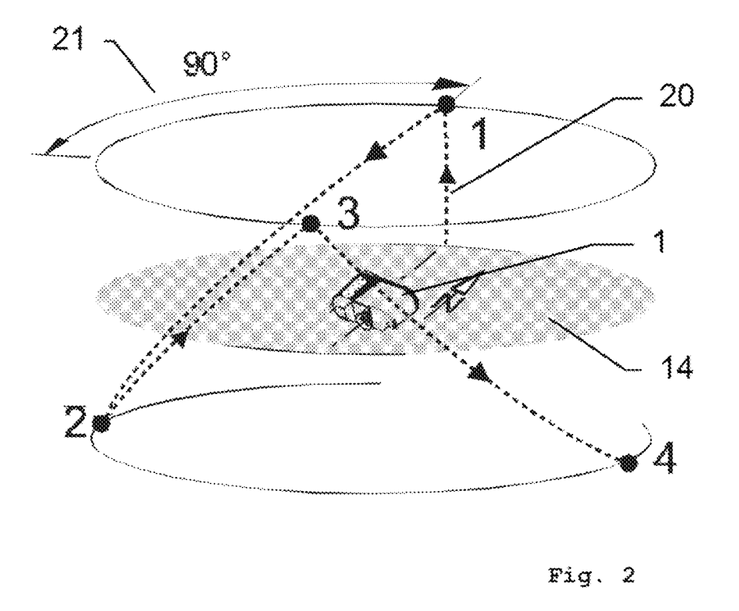
FIG. 2 shows an example of one possible embodiment of an alignment pattern for the handheld observation device, which can be used according to the invention for a calibration or compensation of disturbance influences and a user guidance.

FIG. 2 shows a simple example of a calibration pattern with N=4 desired directions to be targeted, which are numbered from 1 to 4 and are connected by the dashed path 20. In the azimuth, three 90° rotations 21 are carried out, each associated with a change in elevation to a desired angle above or below the horizontal plane 14. With the aid of this pattern, it is possible to obtain a magnetic coarse calibration or coarse compensation.

Depending on the type of observation device and also depending on whether the device is for example handheld or freely movable or mounted somewhere, the desired pattern may be different.

Since the calibration or compensation calculations can also encompass determining a quality factor, possible problems can also be determined at the end of the calibration or compensation method and indicated to a user, whereupon a different calibration or compensation routine with a different pattern or a different start position can be performed.

For successively aligning the device with the N orientations of a set, the observation device 1 has a user guidance in order to make it easier for a user to align the device within a reasonable range around these orientations. With regard to the alignment and setting in relation to the roll axis, the guidance is generally not a problem; these settings can be determined with more than required accuracy of one or a few degrees by means of the inclination sensors of the DMC.

With regard to the azimuth, however, the sole available measurement values are the data $\psi_2$ from the compass 2 itself that is to be calibrated. In this case, it must initially be assumed that the previous compensation parameters for the compass are sufficiently accurate, such that at least an approximate azimuth direction $\psi_2$ can be supplied within acceptable limits, i.e. within an error range of ±20° (in accordance with the above example).

However, in many cases it cannot be guaranteed that the magnetic field sensors still supply usable measurement values within the tolerance range for the calibration pattern. Such a situation is generally not obvious when the calibration routine is started, and possibly does not even become obvious during the calibration.

Accordingly, the calibration guidance in the prior art cannot be performed if the magnetic disturbance is too great, which is a problem in the case of modern observation devices 1, particularly since the devices 1 are becoming smaller ($r^3$ rule of the attenuation of the magnetic field) and comprise more electronic equipment, associated with electric currents that lead to magnetic fields. By way of example, a simple battery exchange may necessitate a recalibration. The present invention overcomes this problem which in the worst case can make the entire compass functionality unusable.

Figure 3:
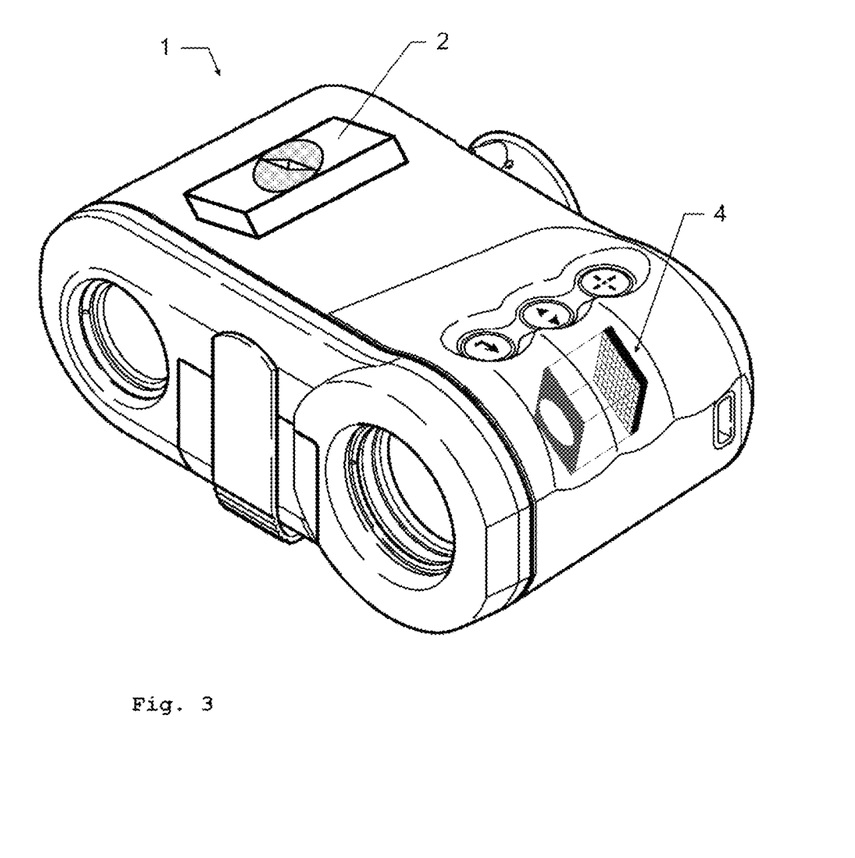
FIG. 3 shows a handheld observation device according to the invention with a first embodiment of a video tracking system.

FIG. 3 shows an example of the construction of an observation device 1 according to the invention (on the basis of the example of binoculars having an integrated compass function). A digital magnetic compass 2 and a video tracking system 4 are accommodated in a rigidly connected manner in the observation device. The digital magnetic compass 2 serves to measure the orientation of the device 1 relative to the north direction and the gravitation direction. The video tracking system 4 monitors and/or reduces the measurement errors that occur in the process.

Figure 4:
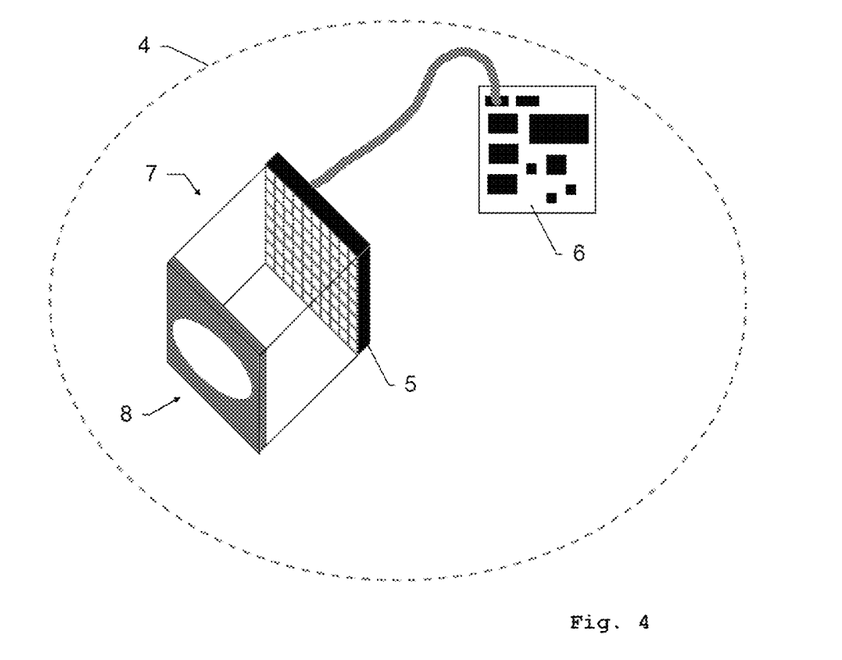
FIG. 4 shows details of the video tracking system from FIG. 3.

FIG. 4 illustrates details of the video tracking system 4. The latter comprises an objective 8, which images part of the surroundings onto a camera sensor 5. Examples of such camera sensors are commercially available CCD or CMOS sensors. The video tracking system 4 is integrated into the observation device 1 such that part of the surroundings of the device 1 is imaged onto the camera sensor 5. An electronic control and evaluation unit 6 enables the camera sensor 5 to record images of said surroundings and to send them to the control and evaluation unit 6. The camera sensor 5 together with the objective 8 is designated hereinafter as camera 7. The center of the entrance pupil of the objective 8 corresponds to a good approximation to the camera center that is essential for the calculations of the position alteration. The control and evaluation unit 6 uses the images sequentially recorded by the camera 7 to calculate the rotation of the associated camera orientations.

If a pure rotation of the camera 7 about the camera center takes place between two image recordings (for example an image j and an image j+1), then this rotation can be measured directly provided that common objects are still imaged in both images (see e.g. "Multiple View Geometry in Computer Vision", Second Edition. Richard Hartley and Andrew Zisserman, Cambridge University Press, March 2004). In an associated mathematical representation of the rotational movements, a matrix $R_{j,j+1}$ arises for the individual rotations of the j-th camera orientation with respect to the camera orientation j+1 of the next image. For longer measurements in larger angle ranges, the individual rotations can be suitably combined to form a total rotation $R_{1,j}$ (rotation of the first camera orientation with respect to the camera orientation of the j-th image).

For the measurement of a translation of the camera center in the event of a general position change, the use of a camera 7 having a large field-of-view angle and/or a corresponding multi-camera system and/or the use of additional information (for example GPS information) are/is necessary for accuracy reasons. Depending on the required measurement accuracy for the measurement of the orientation, for excessively large translation distances it is necessary to take account of the change in the image content as a result of the transmission and to correspondingly correct the measurement of the rotation.

The camera can also be embodied as a combination of an infrared optical unit (NIR, MIR, FIR, thermal infrared) with an infrared sensor appropriately matching the latter. This enables measurement even in darkness.

The video tracking system 4 can also be constructed from a plurality of and different cameras, in particular for stabilizing the measurement by an enlarged field of view of all the camera elements or by measurement with imaging at different wavelengths. The objective 8 can likewise be embodied as part of an optical system, such that parts of the objective components can also be used for functions other than video tracking.

Figure 5:
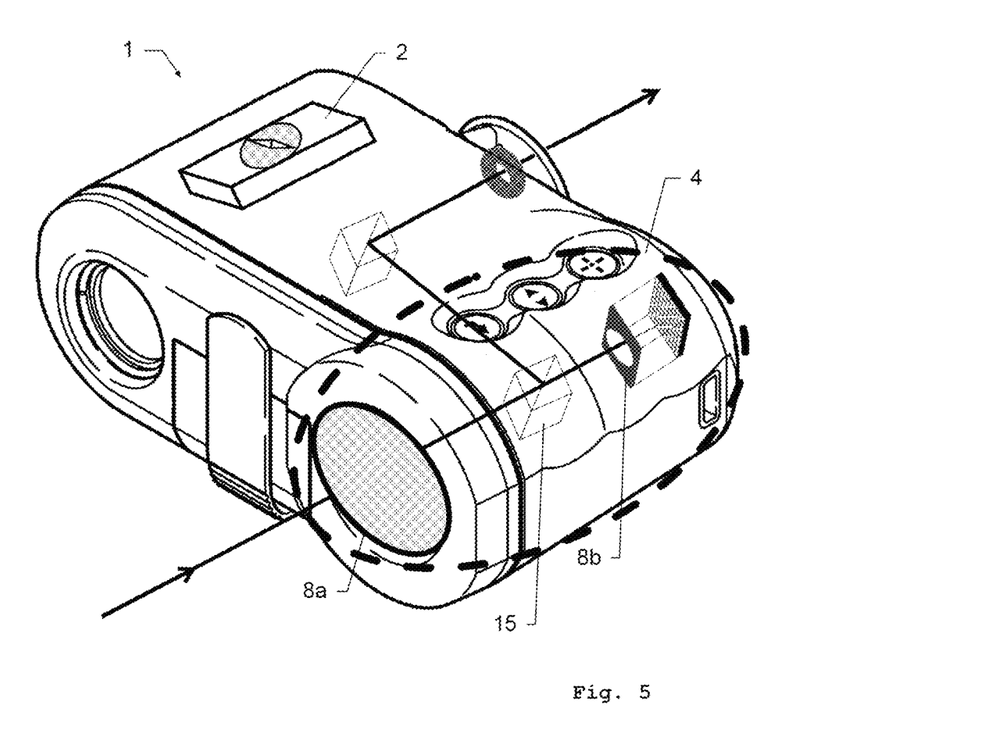
FIG. 5 shows a further handheld observation device according to the invention with a second embodiment of a video tracking system.

One example of this is shown in FIG. 5. Here the video tracking system 4 has a compound objective comprising a front objective part 8a and a rear objective part 8b. The front objective part 8a is additionally used as an objective for a telescope for visual observation. The two beam paths are separated here by way of example by means of a beam splitter cube 15.

The digital magnetic compass 2 is situated in a manner rigidly connected to the video tracking system 4. Said compass comprises for example three magnetic field sensors and an inclination sensor (not illustrated). The inclination sensor can in turn be constructed from two or three acceleration sensors. The control and evaluation unit 6 calculates, from the measurements of the inclination measurement and the magnetic field measurement, the orientation with respect to magnetic north direction and the direction of the gravitational field. Optionally, an additional processing can correct the direction to the geographical north direction or carry out arbitrary transformations into other coordinate systems.

The measurement of Earth's magnetic field can easily be disturbed, inter alia by magnetic or magnetizable components of the observation device. In order to counteract that, an algorithmic disturbance suppression that minimizes the effect of such disturbances on the measurement values of the orientation determination is used during the processing of the sensor data.

The advantageous use of orientation measurements of a video tracking system 4 for improving the compass measurement is explained by way of example below on the basis of a specific model for disturbance suppression. This model is merely one example of many possibilities for such disturbance suppression.

During the calibration process, N individual measurements are performed at different orientations of the device.

Each of the individual measurements (j=1 . . . N) contains in each case the measurement of a magnetic field sensor ($u_j$) and the vector of the gravitational field ($g_j$), said vector being measured by the inclination sensor.

The disturbance suppression to be calibrated establishes an invertible relationship between the Earth's magnetic field vector $h_j$ and the measured magnetic field ($u_j$):

$$\vec{u}_j = \vec{u}_0 + \overline{M} \cdot \vec{h}_j \qquad (1)$$

The compensation parameters to be determined are the components of $u_0$ and M.

If the inclination b (angle between alignment of the magnetic field and horizontal plane) and the azimuth angles $a_j$ of each individual measurement are known during the calibration, then with the relationship $$\vec{h}_j = \vec{g}_j \sin(b) + \vec{n}_j \cos(b) \qquad (2)$$

using the magnetic field vector $n_j$ projected into the horizon plane $$\vec{n}_j = \vec{e}_j \sin^*(a_j) + \vec{f}_j \cos(a_j) \qquad (3)$$

and the two orthogonal components of the horizon plane, $e_j$ (target axis direction) and $f_j$, for each measurement ($u_j$, $g_j$) it is possible to calculate the Earth's magnetic field $h_j$.

Given a suitable choice of the measurement points, this yields 3N independent equations for determining the components of equation (1) as the basis of a compensation problem for calculating the compensation parameters $u_0$ and M and the parameter b (together 13 parameters). For an overdetermined system of equations, at least 5 individual measurements are necessary.

In practical applications, however, the exact azimuth angles $a_j$ are rarely known during the calibration. In this case, either it is possible to use a reduced model for disturbance suppression (but this has a correspondingly negative effect on the measurement errors), or the unknown azimuth angles are concomitantly calculated as part of a more complicated compensation problem.

This last requires more individual measurements, however, since the N different azimuth angles $a_j$ must also be calculated in addition to the 13 compensation parameters. For an overdetermined system of equations, at least 7 individual measurements (with complicated geometry) are thus necessary.

With a video tracking system, as explained above, rotation and/or position changes can be measured highly accurately. The rotation about the camera center is measured in this case. The center of rotation of the magnetic compass 2 is generally different therefrom and lies in the interior of the DMC 2. During the rotation of the device 1, a translation of at least one center of rotation occurs on account of the deviation of the centers of rotation. As a result of the small distances within the orientation device 1, however, this translation remains negligibly small. Consequently, the measured azimuth angles are directly comparable.

The azimuth angle in equation (3) can be formulated by the first azimuth angle $a_1$ and the deviations with respect thereto $da_j = a_j - a_1$:

$$\vec{n}_j = \vec{e}_j(\sin(a_1)\cos(da_j) + \cos(a_1)\sin(da_j)) + \vec{f}_j(\cos(a_1)\cos(da_j) - \sin(a_1)\sin(da_j))$$

For the 13 components of the compensation parameters, only the first azimuth angle $a_1$ is calculated; all deviations $da_j$ from the first azimuth are measured by the video tracking system. For an overdetermined system of equations, only 5 individual measurements are thus necessary.

Assistance of an inclination measurement by means of the device by the measurements of the video tracking system also affords major advantages. The video tracking system measures in each case the total rotation matrix $R_{1j}$ (rotation of the 1st camera orientation with respect to the camera orientation of the j-th image). All that is necessary is an initial inclination measurement at the point in time of the first image recording. All further inclinations are calculated by means of equation (4).

$$\vec{g}_j = \overline{R}_{1j} \cdot \vec{g}_1 \qquad (4)$$

Instead of the conventional calibration with driving of prescribed positions and individual measurements in the quiescent state, measurements can thus also be carried out during a pivoting movement. In this regard, a very large number of individual measurements and thus a significant improvement in the accuracy in the solution of the compensation problem for calculating the compensation parameters are obtained in the course of general pivoting movements (simplified geometry, less complexity from the user). This leads to a significantly faster calibration that is more pleasant for the user, with at the same time increased accuracy.

If the calibration has been carried out as described, the azimuth angle a sought can be calculated by inversion of equation (1) from a measurement of the magnetic field sensor u and the vector of the gravitational field g, said vector being measured by the inclination sensor.

If the magnetic property of the surroundings of the compass changes after the calibration, the disturbance suppression is possibly no longer optimally parameterized, with the result that measurement errors occur. In order to warn the user if renewed calibration of the compass is necessary, the video tracking system is used in accuracy-critical measurements in order to monitor the orientations measured by the compass. If the difference between two orientations measured by the compass does not correspond to the orientation change measured by the video tracking system, this is attributable for example to new magnetic disturbances not taken into account during the calibration. It is possible for the user to constrain a recalibration of the system, and/or to use a direct improvement of the measurement values by means of an algorithmic sensor fusion (sensors DMC, video tracking system) for example with a Kalman filter. For correction purposes, the sensor fusion can, of course, use not only the sensors described but also other (including external) sensors, for example measurements of IMU or GPS.

As a result of external information being predefined, a video tracking system can calculate a transformation from its camera coordinate system into an underlying map coordinate system. The video tracking system is thus able to yield absolute direction measurements (for example relative to the magnetic north direction) (instead of the relative measurements used hitherto). One example of such external information is the map coordinates of the own location (GPS) and at least two reference points which are visible to the video tracking system and whose map coordinates are known. The absolute direction measurements of the video tracking system can be used to monitor or improve the measurements of the compass and thus to calibrate or compensate for extensive disturbances of the Earth's magnetic field which would not be able to be compensated for or calibrated by means of a conventional disturbance suppression of the compass.

It goes without saying that these illustrated figures merely illustrate possible exemplary embodiments schematically. The various approaches can likewise be combined with one another and with methods from the prior art.

The invention claimed is:

1. A handheld observation device comprising
a digital magnetic compass for measuring a magnetic field direction of a magnetic field present,
a gravitation sensor for measuring a gravitational field direction of the gravitational field present, and
a control and evaluation unit configured for determining an externally referenced orientation of the observation device depending on a measured magnetic field direction and a measured gravitational field direction and with application of an algorithmic disturbance suppression, for which compensation parameters—relating to a compensation of local magnetic field disturbance influences—are stored,
further comprising:
a video tracking system for recording an image sequence and for deriving—carried out on the basis of the image sequence—orientation changes of the observation device,
and in that
the control and evaluation unit is configured in such a way that the determination of the externally referenced orientation is furthermore influenced by orientation changes derived by the video tracking system, in particular by virtue of the fact that the stored compensation parameters are based, inter alia, on orientation changes derived by the video tracking system.

2. The handheld observation device according to claim 1, wherein,
the evaluation and control unit provides a calibration functionality designed to carry out a calibration of the disturbance suppression in a user-assisted manner in the field, wherein for the calibration a sequence of a plurality of calibration measurements is defined, in particular at least five, for which the observation device is to be brought into a plurality of different rotational positions, and wherein calibration measurement variables are automatically detected in the context of the calibration functionality, including—at least for each of the calibration measurements—a magnetic field direction measured by the magnetic compass, in particular also a gravitational field direction measured by the gravitation sensor, and on the basis of said calibration measurement variables the stored compensation parameters are checked and in particular, if appropriate, updated, in particular overwritten.

3. The handheld observation device according to claim 2, wherein,
the control and evaluation unit is configured in such a way that in the context of the calibration functionality, as the calibration measurement variables used for checking and, if appropriate, updating the compensation parameters, furthermore differences between the rotational positions of the observation device adopted in the respective calibration measurements are automatically detected among one another, which are calculated on the basis of orientation changes derived by the video tracking system.

4. The handheld observation device according to claim 3, wherein,
the control and evaluation unit is configured in such a way that the differences—detected as part of the calibration measurement variables—in the adopted rotational positions among one another, which are calculated on the basis of orientation changes derived by the video tracking system, are detected in at least one rotational degree of freedom, namely with respect to an azimuthal component, in particular in three rotational degrees of freedom, i.e. with respect to an azimuthal, an elevational and a rolling-angle component.

5. The handheld observation device according to claim 2, wherein,
the control and evaluation unit is configured in such a way that in the context of the calibration functionality for bringing the observation device into the plurality of different rotational positions on the part of the user automatically
orientation changes are derived by the video tracking system,
depending on the orientation changes respectively derived a respective item of user guidance information is derived regarding a rotational position change to be carried out, in order thereby to attain a respective rotational position from the plurality of different rotational positions, and
the user guidance information is output via output means provided on the observation device.

6. The handheld observation device according to claim 1, wherein,
the orientation changes of the observation device are derived by the video tracking system in at least one rotational degree of freedom, namely with respect to an azimuthal component, in particular in three rotational degrees of freedom, i.e. with respect to an azimuthal, an elevational and a rolling-angle component.

7. The handheld observation device according to claim 1, wherein,
the video tracking system is furthermore configured for deriving—carried out on the basis of the image sequence—translational position changes of the observation device, and in that the determination of the externally referenced orientation is furthermore also influenced by translational position changes derived by the video tracking system, in particular by virtue of the fact that the stored compensation parameters are based, inter alia, on translational position changes derived by the video tracking system, especially wherein the derived translational position changes are used for the compensation of translational location changes of the observation device that are caused in the context of bringing the observation device into the plurality of different rotational positions.

8. The handheld observation device according to claim 1, wherein,
the control and evaluation unit is configured for determining a series of externally referenced orientations for a series of adopted rotational positions of the observation device and in this case the respective externally referenced orientations are determined depending on
a respectively measured magnetic field direction,
a respectively measured gravitational field direction, and
differences between the rotational positions of the observation device respectively adopted in the context of the series among one another, which are calculated on the basis of orientation changes derived by the video tracking system, and
with application of the algorithmic disturbance suppression.

9. The handheld observation device according to claim 1, wherein,
the control and evaluation unit is configured in such a way that in the context of a determination of a series of externally referenced orientations for a series of adopted rotational positions of the observation device the stored compensation parameters are automatically checked by virtue of the fact that
differences between the respectively determined externally referenced orientations
are compared with
differences between the rotational positions of the observation device respectively adopted in the context of the series among one another, which are calculated on the basis of orientation changes derived by the video tracking system,
in particular wherein for the case where a deviation of the differences between the respectively determined externally referenced orientations from the differences calculated—on the basis of orientation changes derived by the video tracking system—exceeds a defined permitted deviation maximum, an item of user information recommending or initiating a further calibration is output automatically via output means provided on the observation device.

10. The handheld observation device according to claim 1,
wherein,
the evaluation and control unit provides a referencing functionality designed to produce a magnetic-compass-independent external referencing relative to an orientation of the observation device in a user-assisted manner in the field, for which purpose a sequence of at least one targeting of a known target is defined, about which target information enabling the external referencing is stored or is present by way of user input, for which targeting the observation device is to be brought into a referencing rotational position targeting the at least one target, and in this case in said referencing rotational position and in continuation an image sequence is automatically continuously recorded by the video tracking system and orientation changes of the observation device are derived on the basis thereof, such that in continuation automatically externally referenced orientations are determinable also exclusively depending on
differences between the referencing rotational position and respective rotational positions of the observation device adopted in continuation among one another, wherein said differences are calculated on the basis of orientation changes derived by the video tracking system, and
with inclusion of the available information about the known target enabling the external referencing.

11. The handheld observation device according to claim 10,
wherein,
the control and evaluation unit is configured in such a way that in the context of a determination of an externally referenced orientation for adopted rotational positions of the observation device a check in particular with regard to influencing by regional magnetic field disturbances can be carried out automatically on the basis of a comparison of the determined externally referenced orientation with an externally referenced orientation determined separately in the context of the referencing functionality, in particular wherein a compensation of regional magnetic field disturbance influences is carried out automatically on the basis thereof.

12. The handheld observation device according to claim 1,
wherein,
the digital magnetic compass is equipped with inclination sensors, wherein measurements of the inclination sensors can be assisted by orientation change measurements by the video tracking system, and/or the evaluation and control unit is configured in such a way that measurement values of an inertial measurement unit and/or navigation data, in particular GPS data, can be included in the determination of the externally referenced orientation of the observation device.

13. The handheld observation device according to claim 1,
wherein,
the observation device has at least one continuous observation beam path having an input objective and an output eyepiece for an observer, and/or
the video tracking system has an objective, by which at least part of surroundings captured by the objective can be imaged onto a camera sensor, in particular wherein the objective is embodied as a compound objective having a front objective part and a rear objective part, in particular wherein the front objective part is additionally usable as an objective for a telescope for visual observation.

14. A method for determining an externally referenced orientation of a handheld observation device comprising measuring a magnetic field direction of a magnetic field present by means of a digital magnetic compass provided in the observation device, measuring a gravitational field direction of a gravitational field present by means of a gravitation sensor provided in the observation device, and determining the externally referenced orientation of the observation device depending on the measured magnetic field direction and the measured gravitational field direction and with application of an algorithmic disturbance suppression, for which compensation parameters—relating to a compensation of local magnetic field disturbance influences—are present, wherein, determining the externally referenced orientation is furthermore influenced by orientation changes derived by a video tracking system provided in the observation device, wherein the orientation changes are derived on the basis of an the image sequence recorded by the video tracking system, in particular wherein an influencing is afforded by virtue of the fact that the stored compensation parameters are based, inter alia, on orientation changes derived by the video tracking system, especially wherein a procedure for which the control and evaluation unit and/or the video tracking system are/is configured according to claim 1 is carried out in the context of the method, in particular wherein the method is carried out by means of an observation device.

15. A computer program product comprising program code, which is stored on a machine-readable carrier, for controlling or carrying out the method according to claim 14, in particular for controlling or carrying out a procedure for which the control and evaluation unit is configured if the program is executed on an electronic data processing unit, especially wherein the electronic data processing unit serves as the control and evaluation unit of an observation device.

* * * * *